United States Patent Office 3,264,117
Patented August 2, 1966

3,264,117
FREE-FLOWING, NON-CAKING BROWN SUGAR
Charles P. Graham, Hicksville, and Augustino S. Agate, Ozone Park, N.Y., assignors to American Sugar Company, New York, N.Y., a corporation of New Jersey
No Drawing. Filed Oct. 17, 1963, Ser. No. 317,082
12 Claims. (Cl. 99—141)

This invention relates to sugar and to a method of preparing sugar products. More particularly, this invention relates to a free-flowing, non-caking brown sugar and to a method of preparing same. Still more particularly, this invention relates to brown sugar having improved physical properties as evidenced by free-flowing and anti-caking properties even after relatively long periods of storage under conditions of relatively high humidity.

Brown sugars or so-called "soft" sugars of commerce are sugars made up of sucrose crystals coated with molasses, like raw sugar. These sugars range in color from light yellow to dark brown and all have a molasses taste and odor, the darker "soft" sugars having a stronger taste. Brown or "soft" sugars are sold in various grades, such as soft #6 (light yellow), a light straw colored, moist sugar with a slight molasses flavor used mainly in baked goods; soft #8 (medium yellow), a yellow, moist sugar darker than #6 and with slightly more pronounced flavor; soft #10 (golden brown), a golden, moist sugar with a pronounced molasses taste; and soft #13 (dark brown), the darkest of the moist sugars with the strongest molasses taste.

Soft sugars are available in household size packages. It has been observed that during storage, particularly after the original package has been broken and/or the soft sugar otherwise exposed to the atmosphere, that the soft sugar becomes dry, hard and lumpy due to the loss of moisture from the molasses coating surrounding the sucrose crystals of the sugar. In some instances the sugar becomes so hard and lumpy, almost cement-like, that the sugar is no longer useful for household purposes and must be discarded.

It is an object of this invention to provide an improved brown or soft sugar product.

Another object of this invention is to provide a method for the manufacture of an improved brown or soft sugar product.

Another object of this invention is to provide a brown or soft sugar composition having improved physical properties as evidenced by free-flowing and anti-caking properties even after relatively long periods of storage.

Still another object of this invention is to provide a brown sugar product, and method of preparing the same, having improved storage or keeping properties.

How these and other objects of this invention are achieved will become apparent in the light of the accompanying disclosure.

In accordance with this invention it has been discovered that a brown or soft sugar composition containing an admixture of a minor amount of additives, such as a minor amount of a polyol and a minor amount of an additive selected from the group consisting of cellulose crystallite aggregates, alginates, hydrated alkali aluminum silicates, glycerol monostearate and methylcellulose, possesses improved storage properties with respect to free-flowing ability and non-caking properties. Also, in accordance with this invention, an improved method of preparing free-flowing, non-caking brown sugar containing a special combination of additives therein has been discovered.

In accordance with this invention a combination of additives including a polyol, such as glycerol or propylene glycol, at a concentration of about 2% by weight in the finished brown sugar composition, together with an amount in the range from about 0.5 to about 2% by weight of an additive material selected from the group consisting of cellulose crystallite aggregates, e.g. Avicel, sold by American Viscose Corp., see U.S. Patent 3,023,-104, alginates, such as Keltose, sold by Kelco Co., hydrated alkali aluminum silicates, such as Zeolex, sold by J. M. Huber Co., glycerol monostearate and methylcellulose, when incorporated in brown sugar imparts to the resulting sugar composition free-flowing and anti-caking properties.

In the preparation of the improved brown sugar compositions in accordance with this invention it was found that the method of incorporating the additives in the brown sugar was important in the preparation of a satisfactory, saleable product. Specifically, it was found that the dry additive material, such as the cellulose crystallite aggregates, the alginates, the hydrated alkali aluminum silicates, the glycerol monostearate and the methylcellulose must be added first to the brown sugar, followed by admixing or riffling gently to yield a substantially lump-free, free-flowing sugar. The polyol, such as glycerine, a constituent of the combination of additives, must then be added. It was observed that the free-flowing characteristics of the resulting brown sugar compositions was retained and that the product possessed good anti-caking properties. It is believed that the initial incorporation of the dry additive materials in the brown sugar effects a separation of the brown sugar into discrete particles, thereby permitting a more intimate coating by the polyol constituent, such as the glycerine, without requiring violent agitation or admixing.

The following is illustrative of the practices of this invention. Samples of the brown sugar compositions of this invention were prepared by gently blending in the dry additive to a #13 soft sugar. Within about 5 minutes after blending there was produced a free-flowing soft sugar. Smear lumps of the sugar not removed prior to blending were not rendered less lumpy during blending. Therefore, the resulting blended admixture was passed through a No. 8 screen to remove any smear lumps originally present in the soft sugar. It was observed that the blended mixture very readily passed through the screen in contrast to soft sugar per se which would plug the screen openings.

Glycerol was then added to the screened and blended admixture of brown sugar and dry additive and the resulting samples were then stored for one week with exposure to an atmosphere wherein the relative humidity varied between 20% and 80%. The following results, set forth in the accompanying table, were observed:

| Sample number | Additive makeup | Condition after 1 week cycling |
| --- | --- | --- |
| 1 | 2% Avicel<br>2% Glycerol | Soft on the plastic side. |
| 2 | 1% Avicel<br>2% Glycerol | Soft and powdery. |
| 3 | ½% Avicel<br>2% Glycerol | Do. |
| 4 | 1% Keltose<br>2% Glycerol | Soft on the plastic side. |
| 5 | ½% Keltose<br>2% Glycerol | Soft and powdery. |
| 6 | 2% Methylcellulose<br>2% Glycerol | Do. |
| 7 | 1% Methyl cellulose<br>2% Glycerol | Semi-soft and powdery. |
| 8 | ½% Methylcellulose<br>2% Glycerol | Soft and powdery. |
| 9 | ¼% Methyl cellulose<br>¼% Keltose<br>2% Glycerol | Do. |
| 10 | 1% Keltose<br>2% Methylcellulose<br>2% Glycerol | Soft and plastic. |
| 11 | 2% Zeolex<br>2% Glycerol | Soft and powdery. |
| 12 | 1% Zeolex<br>2% Glycerol | Do. |
| 13 | ½% Zeolex<br>2% Glycerol | Semi-soft and powdery. |
| 14 | 2% Keltose<br>2% Glycerol | Soft and powdery. |
| Control No. 1 | 2% Glycerol | Hard cake. |
| Control No. 2 | No additives | Do. |

Tests also indicated that the dry additives alone (Avicel, Keltose, methylcellulose, Zeolex) did not impart anti-caking properties to the brown sugar.

Additional tests were carried out which indicated that a gentle method of blending the additive materials to the brown sugar was necessary. In these tests a Patterson-Kelly Twin Shell blender was used. Prior to blending the additive materials with the brown sugar, the brown sugar was processed through a Fitzpatrick comminuter to make certain that the brown sugar was free of lumps. Five pounds of the comminuted brown sugar were then placed in the PK blender and the dry additive material added. Within 2 minutes after mixing or blending within the PK blender the resulting additive-brown sugar admixture was dry-appearing and free-flowing except for some lumps of brown sugar which formed within the first 30 seconds of mixing before all the added dry additive was able to mix intimately with the brown sugar.

After 2 minutes of blending within the PK blender the blending operation was stopped and the blended admixture screened to remove any lumps. It was observed that the blended admixture passed very readily through a No. 8 screen, about 75% passing therethrough. This screened material was then put back in the PK blender and no additional lumps were formed. It is speculated that if the PK blender were equipped with an intensifier bar lump formation during initial blending of the dry additive material would be eliminated. The polyol constituent, glycerol, of the combination of additives was then added to the screen blended admixture within the PK blender and blended therein.

The results of this work again indicated that a free-flowing, substantially non-caking, brown sugar product can be prepared by suitably incorporating in brown sugar a minor amount of a combination of additives including a polyol, such as glycerine, and an additive selected from the group consisting of cellulose crystallite aggregates, alginates, hydrated alkali aluminum silicates, glycerol monstearate and methylcellulose. The above tests also indicated that the method of and the sequence of the addition of the additive material to the brown sugar were important in the preparation of a free-flowing, anti-caking brown sugar composition. Specifically, these tests indicated that the addition of the dry additive material first to the brown sugar, followed by gentle blending or riffling, such as is afforded by a Patterson-Kelly Twin Shell blender, followed by the incorporation and blending of the polyol additive constituent, produces a brown sugar product having free-flowing and anti-caking properties. The fact that the combination of additives produced a brown sugar composition of improved properties was unexpected since neither additive alone when incorporated in brown sugar will prevent caking.

As will be apparent to those skilled in the art in the light of the foregoing disclosure, many modifications and substitutions are possible in the practice of this invention without departing from the spirit or scope thereof.

I claim:

1. A free-flowing, non-caking brown sugar consisting essentially of about 2% by weight of a polyol selected from the group consisting of glycerol and propylene glycol and from about 0.5–2% by weight of an additive selected from the group consisting of cellulose crystallite aggregates, alginates, hydrated aluminum silicates, glycerol monostearate and methylcellulose, the remainder being brown sugar, said free-flowing, non-caking brown sugar having been prepared by first adding and mixing said additive to granulated brown sugar followed by adding to the admixture said polyol and blending the resulting admixture.

2. A free-flowing, non-caking brown sugar in accordance with claim 1 wherein said polyol is glycerol.

3. A free-flowing, non-caking brown sugar in accordance with claim 1 wherein said additive is cellulose crystallite aggregates.

4. A free-flowing, non-caking brown sugar in accordance with claim 1 wherein said additive is an alginate.

5. A free-flowing, non-caking brown sugar in accordance with claim 1 wherein said additive is a hydrous alkali aluminum silicate.

6. A free-flowing, non-caking brown sugar in accordance with claim 1 wherein said additive is methylcellulose.

7. A method of producing a free-flowing, non-caking brown sugar which comprises admixing with granulated brown sugar from about 0.5 to about 2% by weight of an additive selected from the group consisting of cellulose crystallite aggregates, alginates, hydrated alkali aluminum silicate and methylcellulose and adding to the resulting admixture about 2% by weight of a polyol selected from the group consisting of glycerol and propylene glycol.

8. A method in accordance with claim 7 wherein said additive material is cellulose crystallite aggregates and wherein said polyol is glycerol.

9. A method in accordance with claim 7 wherein said additive material is an alginate and wherein said polyol is glycerol.

10. A method in accordance with claim 7 wherein said additive material is methylcellulose and wherein said polyol is glycerol.

11. A method in accordance with claim 7 wherein said additive material is hydrated alkali aluminum silicate and wherein said polyol is glycerol.

12. A method of producing a free-flowing, non-caking brown sugar which comprises admixing with granulated brown sugar about 0.5% by weight methylcellulose and about 0.5% by weight alginate to form the resulting admixture wherein said additive materials are uniformly distributed therein and mixing with the resulting admixture about 2% by weight glycerol to form a uniform blend therewith.

References Cited by the Examiner
UNITED STATES PATENTS 2,078,215 4/1937 Allen ---------------- 99—141
2,910,386 10/1959 Lachmann -------- 99—141 X
3,023,104 2/1962 Battista ---------------- 99—1

RAYMOND N. JONES, *Acting Primary Examiner.*
A. LOUIS MONACELL, *Examiner.*
S. E. HEYMAN, *Assistant Examiner.*